| United States Patent [19] | [11] Patent Number: 5,030,176 |
| Hodgetts | [45] Date of Patent: Jul. 9, 1991 |

[54] SINGLE PLY POLYESTER FABRIC AND BELT COMPRISING THE SAME

[75] Inventor: Graham L. Hodgetts, Mars, Pa.

[73] Assignee: Rolflor Industries, Inc., Evans City, Pa.

[21] Appl. No.: 308,886

[22] Filed: Feb. 8, 1989

[51] Int. Cl.$^5$ .......... B32B 1/08; B32B 27/02; B60P 1/38; B65G 15/34

[52] U.S. Cl. .................... 474/261; 139/419; 198/846; 198/957; 414/528; 428/102; 428/111; 428/226; 428/257; 428/272; 474/271

[58] Field of Search .......... 474/267, 271, 261; 198/846, 957; 414/528

[56] References Cited

U.S. PATENT DOCUMENTS

| 3,249,128 | 5/1966 | Lord | 474/267 |
| 3,913,760 | 10/1975 | Koral | 414/528 |
| 3,917,092 | 11/1975 | McGinnis | 414/528 |
| 4,407,333 | 10/1983 | Fowkes | 474/267 |
| 4,581,275 | 4/1986 | Endo et al. | 428/113 |
| 4,674,976 | 6/1987 | Naohara et al. | 198/957 |
| 4,857,379 | 8/1989 | Plontges et al. | 428/102 |

FOREIGN PATENT DOCUMENTS 2032476 5/1980 United Kingdom .

Primary Examiner—James C. Cannon
Attorney, Agent, or Firm—Fleit, Jacobson, Cohn, Price, Holman & Stern

[57] ABSTRACT

A single ply polyester fabric of straight warp construction having at least 200 ends per inch of 1000 denier multifilament yarn in the warp direction and at least 18 picks per inch of 0.4 mm. monofilament yarn in the weft direction with a warp crimp of less than 2%. Preferably, the polyester fabric is impregnated with a nitrile and polyvinylchloride latex and has a polyurethane coating on one surface thereof. The single ply polyester fabric is particularly suitable for use as a belt in an automatic truck loading and unloading system.

1 Claim, No Drawings

SINGLE PLY POLYESTER FABRIC AND BELT COMPRISING THE SAME

FIELD OF THE INVENTION

The invention relates to a novel single ply polyester fabric and to belts comprising the new single ply polyester fabric which are useful in automatic truck loading and unloading systems.

BACKGROUND OF THE INVENTION

It is well known that if a load is placed on a mat or belt, the load can be moved across a flat surface by applying a horizontal force to the belt. A technique for moving light loads of up to 200 pounds using narrow belts having a width of up to 5 feet is commonly used and is often referred to as a slider bed. Typically, such belts are made of a reinforced polyester fabric.

A similar technique is also used in automatic truck loading and unloading systems to move heavy loads of about 15 to 30 tons. In order to move such heavy loads in an automatic truck loading and unloading system, belts having a width of about 7 feet to 8 and ½ feet are required. At this combination of belt width and load, the belt of an automatic truck loading and unloading system must exhibit certain key physical characteristics in order to move the load successfully. Prior to the present invention, the required physical characteristics have been achievable only in multi-ply belts, that is, belts having a number of layers of polyester textile fabric with a rubber or plastic compound between the layers, and in some cases, on the top or bottom of the belt. Such a multi-ply construction is complicated and expensive.

A load-moving system of the slider bed type may be used, for example on trucks or trailers for loading or unloading the vehicle through the back end thereof by means of a powered conveyor belt extending along the bed of the vehicle between front and rear wind-up rolls. Thus, the belt may be attached at its forward end to a front wind-up roll which is, for example, located internally of the truck or trailer adjacent its front wall. The rear end of the belt may be attached to a rear wind-up roll which may be, for example, located externally under the back end of the truck or trailer. When loading the vehicle, the belt is wound onto the front roll, by driving the front roll and, conversely, for unloading the truck or trailer, the belt is wound onto the back roll by driving this roll. An automatic truck or trailer load-moving system using a slider bed technique requires a belt between 7 feet and 8 and ½ feet wide in order to move a load of up to about 30 tons.

After testing of a full size trailer with various loads between 15 and 40 tons, it has been determined that the single most important key physical characteristic of the belt is low stretch. For example, for a belt having a width of 91 and ½ inches, bearing a load weight of 25 tons and having a belt stretch before moving the load of 8%, when a pull on the belt per inch of width in the amount of 210 pounds was exerted, the belt arched longitudinally and finally folded over down part of its length and tracked off to one side. Similarly, for a belt having a width of 82 inches, bearing a load weight of 24 tons and having a belt stretch of 5%, when a pull on the belt per inch of width of 240 pounds was exerted, the belt arched longitudinally and folded over down part of its length and tracked off to one side.

On the other hand, for belts having a belt stretch of 2% and 2 and ½%, respectively, under the same conditions, the belt stayed flat and tracked true during a complete unloading sequence. The belt used in evaluating the significance of belt stretch in the above examples was of the expensive construction type having plies of polyester textile fabric. During the above test, it was also observed that the belt having the greatest lateral stiffness took longer to fold than the belt with the least lateral stiffness. The lateral stiffness of the most successful belt was 101.7 g, as measured by the Gurley test method. The lateral stiffness of the less successful belts ranged from 35 g to 60 g.

It was further observed during testing that the lower the coefficient of friction between the sliding surface of the belt and the floor over which it was sliding, the flatter the belt sat and the better it tracked. A further desirable characteristic of the belt is that it have an abrasion resistant and cut resistant top.

Accordingly, it is an object of the present invention to provide a belt which does not suffer from the disadvantages of known belts.

It is a further object of the present invention to provide a novel polyester textile fabric of sufficient strength and low stretch such that a single layer or ply of the novel polyester fabric would provide a maximum of 3% stretch when subjected to a pull of 300 pounds per inch of belt width applied in a longitudinal direction.

SUMMARY OF THE INVENTION

The present invention relates to a novel polyester textile fabric of single ply, straight warp construction. The novel polyester fabric has a multi-filament polyester warp, a monofilament polyester weft, and a thread count of 1000 denier 200 ends per inch warp and 0.4 mm diameter 18 picks per inch weft. The maximum crimp in the warp of the novel single ply polyester fabric of the invention is 2% and the fabric thickness is less than 2.0 mm. The present invention further relates to a belt comprising the novel single ply polyester material.

DETAILED DESCRIPTION OF THE INVENTION

The polyester textile fabric of the invention has a single ply, straight warp construction. The polyester fabric is characterized by a multi-filament polyester warp and a monofilament polyester weft. The thread count of the polyester fabric of the invention is 1000 denier 200 ends per inch warp and 0.4mm diameter 18 picks per inch weft. The maximum crimp in the warp is 2% and the thickness of the polyester fabric is less than 2.0 mm.

The polyester material of the invention exhibits the following strength characteristics: 1% stretch at a pull of 60 pounds per inch of width, 2% stretch at a pull of 160 pounds per inch of width, and 3% stretch at a pull of 255 pounds per inch of width.

The strength characteristics of a textile material are enhanced by impregnating or coating the material with a homogenous plastic or rubber material. One cover material of choice is polyurethane; however, polyurethane is a relatively expensive material. According to a preferred embodiment of the present invention, the novel polyester fabric is impregnated with a low cost abrasion resistant nitrile rubber in order to fill the voids in the material and thereby reduce the amount of polyurethane needed to achieve a cover thickness in the range of 0.005 to 0.050 inches. Most preferably, the polyester textile fabric is impregnated with a nitrile latex composition having a high polyvinylchloride latex content. Using such a nitrile latex composition with a high polyvinylchloride latex content, a beneficial degree of stiffness is added to the polyester textile fabric. In addition, such an impregnated polyester fabric exhibits an advantageously low coefficient of friction.

In a particularly preferred embodiment of the invention, there is provided a belt for an automatic truck loading and unloading system which comprises the novel single ply polyester material impregnated with a nitrile latex composition having a high polyvinylchloride latex content and having a polyurethane coating on a top side of the belt in order to impart superior abrasion and cut resistance to the belt. The bottom side of the belt is not coated by polyurethane and therefore has a surface of a hard nitrile compound. Preferably, the polyurethane top or coating has a thickness of about 0.020 inches. A suitable polyurethane is Vibrathane 1000 with CAYTUR 21 curative.

A belt according to the present invention comprising the novel single ply polyester fabric, impregnated with a nitrile latex having a high polyvinylchloride latex content, and having a polyurethane coating on the top side of the belt exhibited the following physical characteristics: 1% stretch at a load of 100 pounds per inch of belt width; 2% stretch at a load of 235 pounds per inch of belt width; 3% stretch at a load of 350 pounds per inch of belt width; a lateral stiffness of 96 g; a top cover abrasion resistance of 0.14% weight loss as measured by the Tabor method; a tear resistance of 55 pounds; a bottom side coefficient of friction of 0.21 against a sliding surface; a weight per square foot of 0.5 pounds; and an overall thickness of 0.095 inches.

Although the invention has been described by reference to particular embodiments thereof, it will be understood that modifications may be made without departing from the scope of the present invention as described above and as defined in the claims which follow.

What is claimed is:

1. A belt for use in an automatic truck loading and unloading system, said belt having a width of about 7 to 8 and ½ feet and being capable of moving loads of about 15 to 40 tons, said belt comprising a single ply polyester fabric of straight warp construction with at least 200 ends per inch of 1000 denier multi-filament yarn in the warp direction and at least 18 picks per inch of 0.4 mm monofilament yarn in the weft direction with a warp crimp of less than 2%, said polyester fabric being impregnated with a nitrile and polyvinylchloride latex; and a polyurethane coating on one surface of said polyester material.

* * * * *